United States Patent
Murayama et al.

(10) Patent No.: US 12,543,050 B2
(45) Date of Patent: Feb. 3, 2026

(54) CONTROL APPARATUS, COMMUNICATION SYSTEM, CONTROL METHOD AND PROGRAM

(71) Applicant: NTT, Inc., Tokyo (JP)

(72) Inventors: Daisuke Murayama, Tokyo (JP); Shota Nakayama, Tokyo (JP); Takatsune Moriyama, Tokyo (JP)

(73) Assignee: NTT, Inc., Tokyo (JP)

( * ) Notice: Subject to any disclaimer, the term of this patent is extended or adjusted under 35 U.S.C. 154(b) by 329 days.

(21) Appl. No.: 18/560,790

(22) PCT Filed: Jun. 23, 2021

(86) PCT No.: PCT/JP2021/023871
§ 371 (c)(1),
(2) Date: Nov. 14, 2023

(87) PCT Pub. No.: WO2022/269842
PCT Pub. Date: Dec. 29, 2022

(65) Prior Publication Data
US 2024/0259830 A1 Aug. 1, 2024

(51) Int. Cl.
*H04W 16/00* (2009.01)
*H04W 16/18* (2009.01)
(Continued)

(52) U.S. Cl.
CPC ........... *H04W 16/18* (2013.01); *H04W 16/26* (2013.01); *H04W 84/005* (2013.01)

(58) Field of Classification Search
CPC .... H04W 16/18; H04W 16/26; H04W 84/005
See application file for complete search history.

(56) References Cited

U.S. PATENT DOCUMENTS

| 11,197,227 | B2 * | 12/2021 | Xu | H04W 40/22 |
| 2023/0308893 | A1 * | 9/2023 | Murayama | H04W 16/28 |
| 2024/0251253 | A1 * | 7/2024 | Murayama | H04W 4/029 |

FOREIGN PATENT DOCUMENTS

| CN | 104603853 B | * | 2/2020 | H04B 7/01 |
| WO | WO-2021085132 A1 | * | 5/2021 | H04W 24/02 |

OTHER PUBLICATIONS

Yoshihisa Kishiyama et al., 5G Outdoor Experiment for Ultra-High Speed and Long Distance Transmission Using Millimeter Waves, NTT Docomo Technical Journal, © 2018 NTT Docomo, Inc., Japan, (vol. 26-1, p. 25-32), Apr. 2018.

* cited by examiner

Primary Examiner — Khai M Nguyen
(74) Attorney, Agent, or Firm — IPUSA, PLLC (57) ABSTRACT

Provided is a control apparatus in a wireless communication system including the control apparatus and a movable base station, the control apparatus including: an information acquisition unit that acquires shield sensing information; a shield map generation unit that generates a shield map on the basis of the shield sensing information; a communication quality calculation unit that calculates an estimated received power in each coverage area element or each terminal for each position and direction of an antenna of the movable base station on the basis of the shield map, calculates an estimated communication quality in each coverage area element or each terminal on the basis of the estimated received power, and calculates an index value for controlling the movable base station on the basis of the estimated communication quality; and a base station control unit that controls the position and direction of the antenna of the movable base station so that the index value is maximized.

7 Claims, 7 Drawing Sheets

(51) Int. Cl.
*H04W 16/26* (2009.01)
*H04W 84/00* (2009.01)

CONTROL APPARATUS, COMMUNICATION SYSTEM, CONTROL METHOD AND PROGRAM

TECHNICAL FIELD

The present invention relates to a method of controlling a base station in a wireless communication system.

BACKGROUND ART

The introduction of 5G, which realizes large-capacity systems, high-speed data transmission speeds, low latency, simultaneous connection of many terminals or the like is underway. In 5G, in addition to the frequency bands used in current mobile communications, high frequency bands such as millimeter wave bands are used (Non Patent Literature 1).

CITATION LIST

Non Patent Literature

NPL 1: 5G Outdoor Experiment For Ultra-High Speed And Long Distance Transmission Using Millimeter Waves, Kishiyama, Okumura, et al., NTT DOCOMO Technical Journal (Vol. 26-1, P 25-32)

SUMMARY OF INVENTION

Technical Problem

There are use cases for communication using high frequency bands such as 5G in factories. However, communication quality is not stable in a factory where there are many shields and the shields move. In addition, radio waves in high frequency bands such as 5G have highly rectilinear propagation properties and large losses due to shielding. Therefore, it is important to improve effective communication quality over a wide area so that communication quality can be maintained as much as possible wherever terminals are located.

The present invention has been made in view of the above points, and an object of the present invention is to provide a technique capable of improving the communication quality over a wide area even in an environment with moving shields.

Solution to Problem

According to the disclosed technique, there is provided a control apparatus in a communication system including the control apparatus and a movable base station, the control apparatus including:
  an information acquisition unit that acquires shield sensing information;
  a shield map generation unit that generates a shield map on the basis of the shield sensing information;
  a communication quality calculation unit that calculates an estimated received power in each coverage area element or each terminal for each position and direction of an antenna of the movable base station on the basis of the shield map, calculates an estimated communication quality in each coverage area element or each terminal on the basis of the estimated received power, and calculates an index value for controlling the movable base station on the basis of the estimated communication quality; and
  a base station control unit that controls the position and direction of the antenna of the movable base station so that the index value is maximized.

Advantageous Effects of Invention

According to the disclosed technique, it is possible to improve the communication quality over a wide area even in an environment with moving shields.

DESCRIPTION OF EMBODIMENTS

Hereinafter, an embodiment of the present invention (the present embodiment) will be described with reference to the drawings. The embodiment described below is merely an example, and embodiments to which the present invention is applied are not limited to the following embodiment.

Overview of Embodiment

In the present embodiment, mainly for communication systems such as 5G, a technique for improving effective communication quality over a wide area even in an environment with moving shields will be described. Control is performed by a control device 300 (control apparatus), which will be described later. The outline of control is as follows.

Based on shield detection information (generated from camera image information and LiDAR information), the control device 300 obtains a propagation loss to each coverage area element (or each terminal) for each combination of the position/direction parameters of antennas of a movable base station using ray tracing simulation or the like.

Next, the control device 300 calculates an estimated throughput (or estimated MCS) in each coverage area element (or each terminal) using a relationship between radio wave intensity (RSSI or RSRP) and communication quality (MCS or throughput) obtained in advance and the propagation loss described above.

Then, the control device 300 calculates a total value E of the estimated throughput (or the code rate corresponding to the estimated MCS, etc.) over the coverage area (or all terminals), calculates the antenna position/direction parameters that maximize this E, and controls the movable base station using the calculated position/direction parameters.

Through the above-described control, it is possible to maximize the overall effective communication quality even in an environment where there are shields and the shields move.

The present embodiment will be described in more detail below.

System Configuration Example

In the present embodiment, it is assumed that the communication area of the wireless communication system is formed in an environment such as a factory or warehouse where a large shield moves quasi-statically or dynamically. A communication area is covered by a single base station or a plurality of base stations.

The present invention can be applied to any wireless communication system. However, the present embodiment mainly assumes a wireless communication system such as 5G, and particularly a wireless communication system using a frequency having a highly rectilinear propagation property, such as Above-6 GHz.

Figure 1:
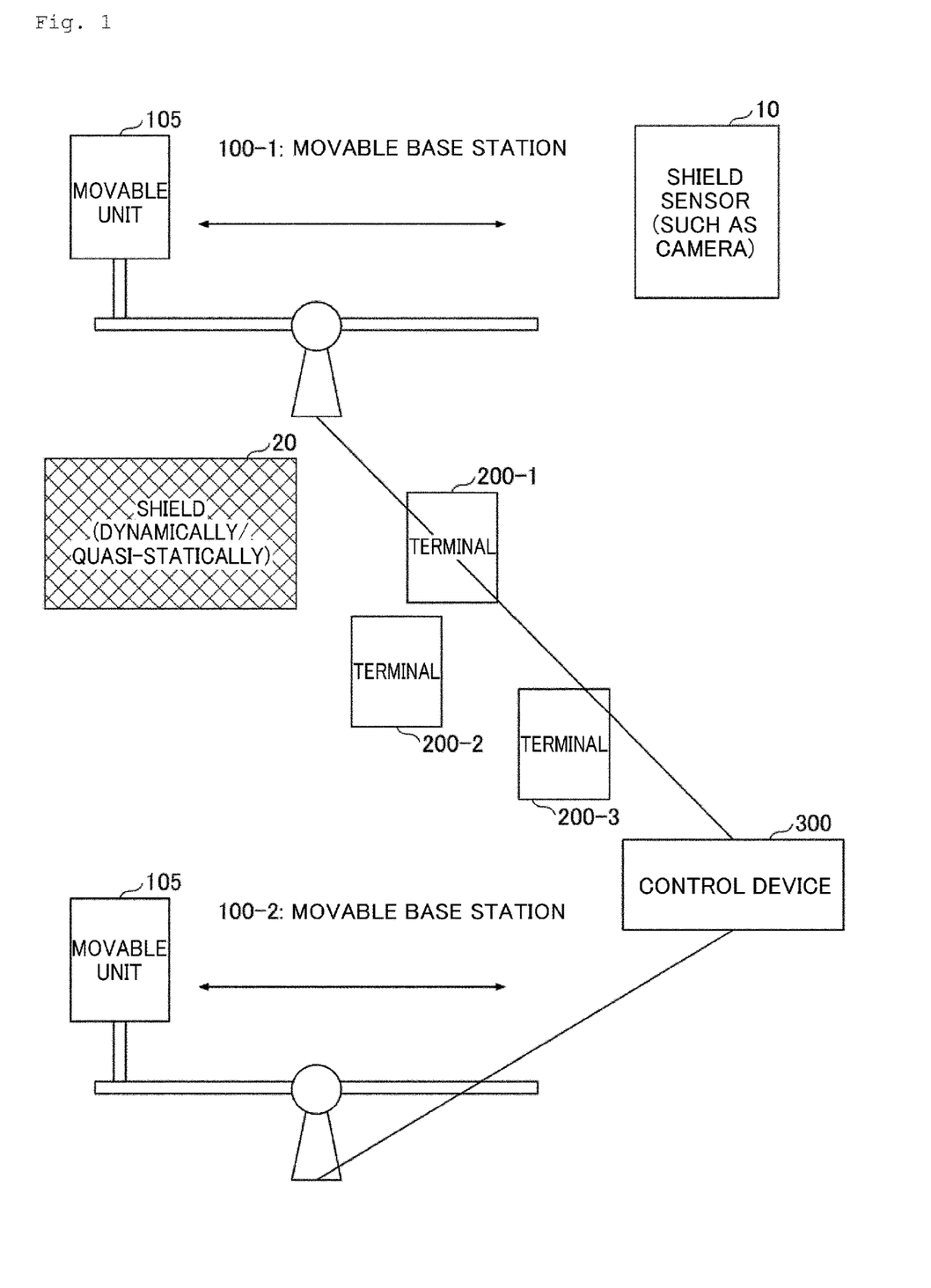
FIG. 1 is a diagram illustrating a configuration example of a communication system according to an embodiment of the present invention.

FIG. 1 illustrates an overall configuration example of a communication system according to the present embodiment. As illustrated in FIG. 1, the communication system includes a movable base station 100-1, a movable base station 100-2, a shield sensor 10, a shield 20, a plurality of terminals 200-1 to 200-3, and a control device 300.

The shield sensor 10 may be any sensor as long as it can detect a shield. The shield sensor 10 is, for example, a camera, a LiDAR, or the like. The shield 20 may be a fixed object or a moving object. As the shield 20, for example, materials, machines, shelves, people, etc. in the factory are assumed.

Each of the terminals 200-1 to 200-3 is a terminal having a function of wirelessly communicating with the movable base station 100.

The control device 300 controls the movable base station 100. The control device 300 may be disposed near the movable base station 100 or at a remote location via a network. The control device 300 may be provided in the movable base station 100. A wired connection or a wireless connection (IAB, WiGig, etc.) may be used between the movable base station 100 and the control device 300.

The movable base station 100 is a base station capable of moving a movable unit 105 which is a part including an antenna serving as a transmission/reception point of radio signals. The direction of the antenna is also variable. It is only necessary for the movable unit 105 to include an antenna, or a functional unit other than the antenna may be provided. The movable unit 105 may be an antenna itself.

Figure 2:
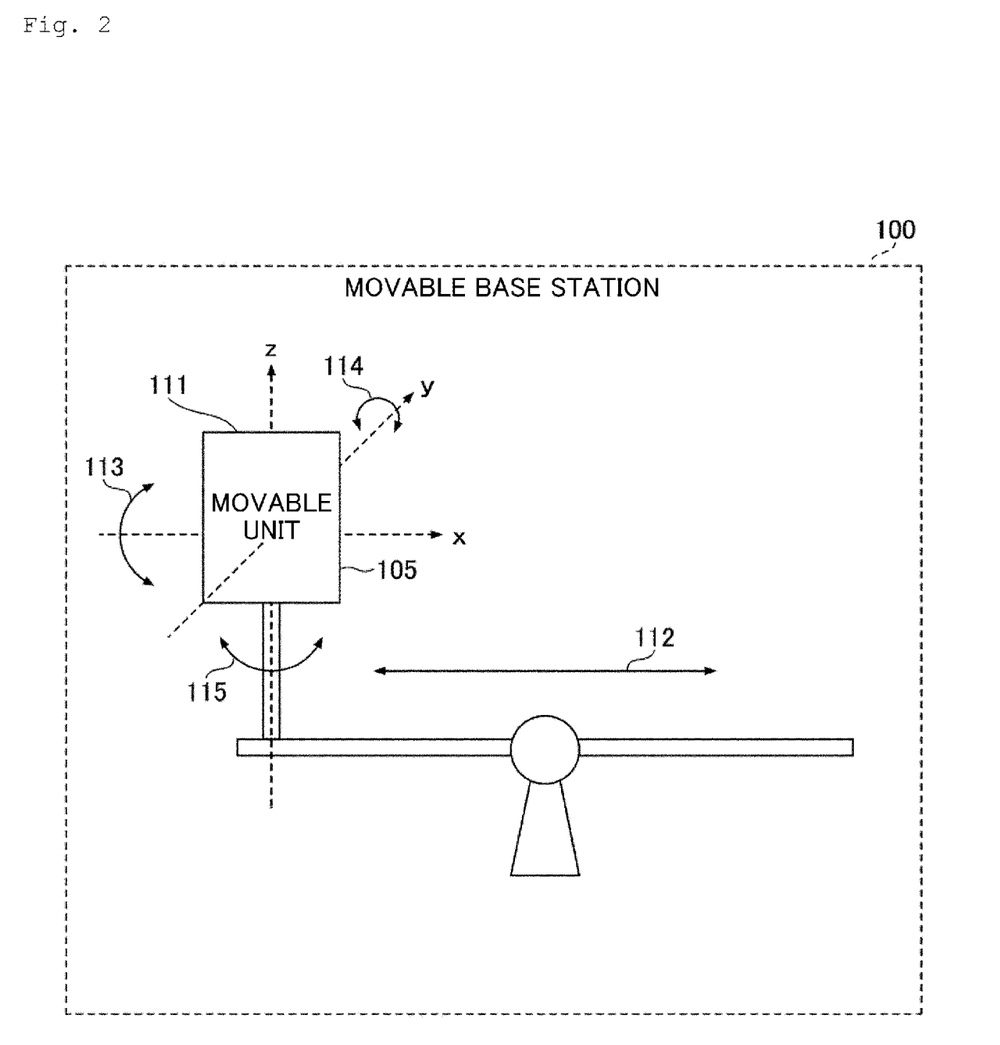
FIG. 2 is a diagram for describing a movable base station 100.

As illustrated in FIG. 2, for example, in the movable base station 100, the position of the movable unit 105 can be changed in the direction indicated by reference numeral 112 by sliding the movable unit 105 on a rail. The rail can also be rotated in the horizontal direction. With this movement control, the movable unit 105 can be disposed at an arbitrary position within a predetermined range.

Also, regarding antenna direction control, for example, the movable unit 105 can be rotated around an x-axis (see reference numeral 113), around a y-axis (see reference numeral 114), and around a z-axis (see reference numeral 115) by a structure supporting the movable unit 105. With this movement control, the antenna can be oriented in an arbitrary direction.

It should be noted that the use of the movable base station 100 that slides on a rail as described above is merely an example. Any method may be used as long as the position and direction of the antenna provided by the base station can be changed. For example, the base station may be mounted on a drone or automated guided vehicle (AGV) to control the position and direction of the antenna of the base station, or the position and direction of the antenna of the base station may be controlled manually.

Although the example illustrated in FIG. 1 illustrates an example in which only the movable base station 100 exists as the base station, a base station having no movable function and a movable base station may be used in combination. In this case, by fixing the position/direction parameters of the base station having no movable function and performing the processing described below, the position/direction parameters can be optimized in the same manner as in the case where only the movable base station 100 is used.

Detailed Configuration Example

Figure 3:
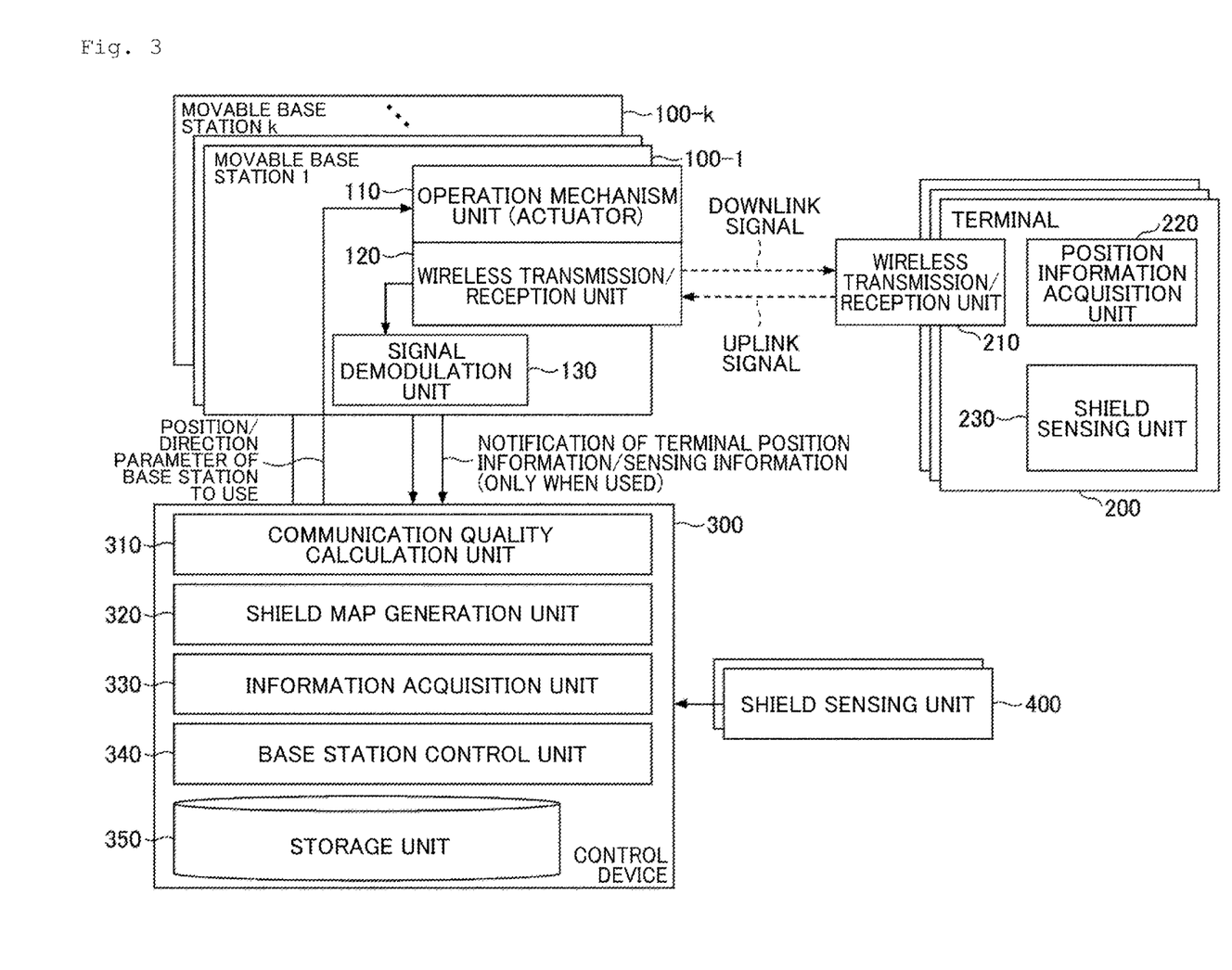
FIG. 3 is a diagram illustrating a configuration of each device in a communication system.

FIG. 3 illustrates a configuration of each device that constitutes the communication system according to the present embodiment. FIG. 3 illustrates an example in which k movable base stations 100-1 to 100-k are provided. When 1 to k are not distinguished from each other, the movable base station will be described as a "movable base station 100." Also, there are a plurality of terminals 200. A shield sensing unit 400 illustrated in FIG. 3 corresponds to the shield sensor 10 illustrated in FIG. 1. The shield sensing unit 400 may be a functional unit included in the control device 300.

<Movable Base Station 100>

As illustrated in FIG. 3, the movable base station 100 includes an operation mechanism unit 110, a wireless transmission/reception unit 120, and a signal demodulation unit 130. The operation mechanism unit 110 is a mechanism for operating the movable unit 105 described above. The operation mechanism unit 110 may be called an actuator. The movable unit 105 may be the wireless transmission/reception unit 120.

The wireless transmission/reception unit 120 has an antenna and transmits and receives radio signals. The signal demodulation unit 130 receives an uplink signal from the wireless transmission/reception unit 120, demodulates the uplink signal, and transmits the demodulated signal to the control device 300.

<Terminal 200>

The terminal 200 includes a wireless transmission/reception unit 210, a position information acquisition unit 220, and a shield sensing unit 230. The wireless transmission/reception unit 210 transmits and receives radio signals. The position information acquisition unit 220 acquires position information of the terminal 200 itself. The shield sensing unit 230 detects shields. The shield sensing unit 230 may be a camera, a LiDAR, or other sensors.

When using the position information of the terminal 200 acquired by the terminal 200 in the control device 300, the position information acquisition unit 220 transmits the position information to the movable base station 100 using an uplink data channel (or control channel), and the movable base station 100 transmits the position information to the control device 300.

The terminal 200 may not include the position information acquisition unit 220. In this case, the control device 300 or the movable base station 100 estimates the terminal position using a camera image or the like.

Shield sensing is performed by the shield sensing unit 400 provided separately from the terminal 200. Here, when the terminal 200 includes the shield sensing unit 230, the shield sensing unit 230 may notify the control device 300 of sensing information (camera image, LiDAR information, etc.) using an uplink signal. The terminal 200 may not include the shield sensing unit 230.

<Control Device 300 (Control Apparatus)>

The control device 300 includes a communication quality calculation unit 310, a shield map generation unit 320, an information acquisition unit 330, a base station control unit 340, and a storage unit 350. The outline of each unit is as follows.

The information acquisition unit 330 acquires shield sensing information, position information of the terminal 200, a relationship between radio wave intensity and communication quality, and the like. The shield map generation unit 320 detects a shield on the basis of the shield sensing information, generates a 3D (or 2D) map, and stores the information in the storage unit 350.

The communication quality calculation unit 310 calculates a propagation loss, an estimated received power, an estimated MCS, an estimated throughput, and the like, and stores the calculated information in the storage unit 350. The base station control unit 340 performs movement control and the like for the movable base station 100.

Operation Example of Communication System

Figure 4:
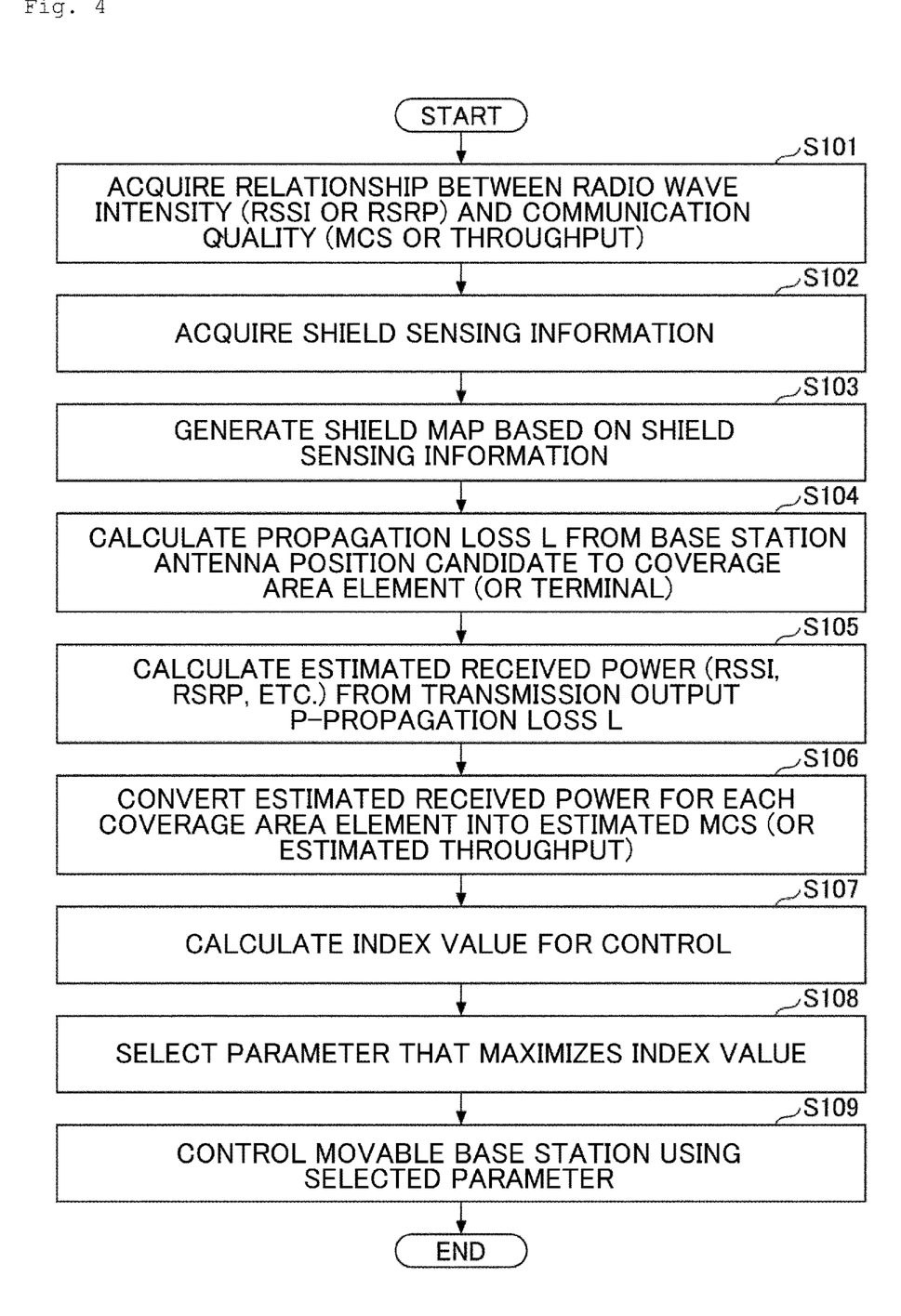
FIG. 4 is a flowchart for describing an operation of the communication system.
Figure 5:
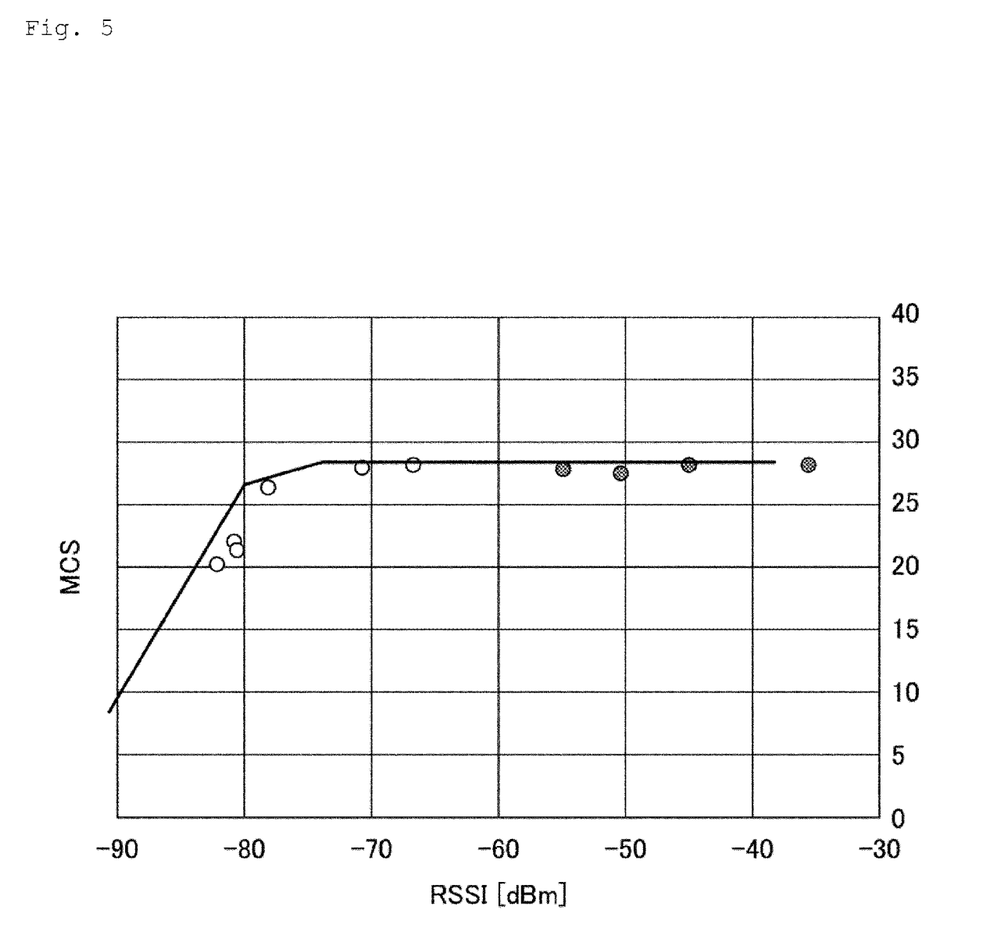
FIG. 5 is a diagram illustrating an example of a relationship between RSSI and MCS.
Figure 6:
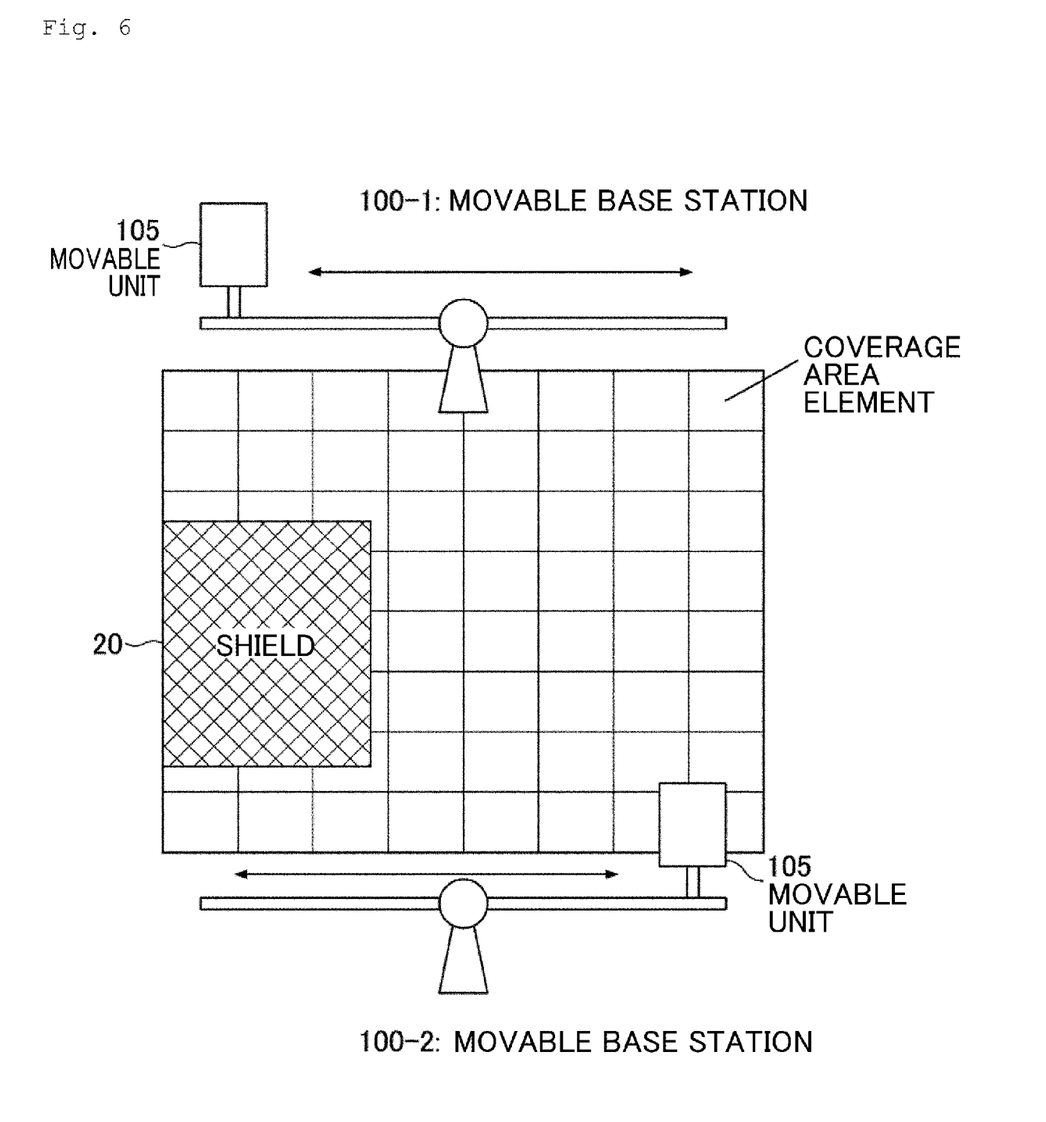
FIG. 6 is a diagram for describing a coverage area element.

Next, an operation example of the communication system (especially the control device 300) will be described with reference to the flowchart shown in FIG. 4. FIGS. 5 and 6 will be referred to in the description as appropriate.

<S101: Relationship Acquisition>

In S101, the information acquisition unit 330 acquires a relationship between radio wave intensity (RSSI or RSRP) and communication quality (throughput or MCS) by actual device measurement (or referring to computer simulation or device specification), and stores the relationship in the storage unit 350.

In the present embodiment, when the MCS is used, the value of the corresponding code rate or the value of the MCS index which is digitized is used as the modulation and coding scheme (MCS). For example, Spectral Efficiency or MCS index in Tables 5.1.3.1-1 to 3 of 3GPP TS 38.214 can be used. A larger MCS index indicates better communication quality.

FIG. 5 illustrates an example of the relationship between RSSI and MCS in DL. Since there are variations in values in the case of experimental data, a correspondence relationship may be obtained by a method such as using an approximate curve (straight line), using a lower limit envelope, or using actual measurement data for the closest power.

<S102: Shield Sensing Information Acquisition>

In S102, the information acquisition unit 330 acquires shield sensing information (camera image information, LiDAR information, etc.) obtained by the shield sensing unit 400, and stores the shield sensing information in the storage unit 350.

<S103: Shield Map Generation>

In S103, the shield map generation unit 320 detects the shield in real time on the basis of the shield sensing information (camera image information, LiDAR information, etc.) acquired in S102 to generate a 3D map (or 2D map). The 3D map includes three-dimensional position information of the shield. The 2D map includes two-dimensional position information of the shield.

<S104: Propagation Loss Calculation>

In S104, the communication quality calculation unit 310 obtains a propagation loss L to a coverage area element for each antenna position/direction parameter for each movable base station by ray tracing simulation or the like.

As illustrated in FIG. 6, the coverage area element is a small area when an area (coverage area) covered by a plurality of base stations to be controlled is divided into small areas. FIG. 6 is a diagram illustrating an example of a coverage area when there are the movable base stations 100-1 and 100-2.

For example, assuming that there are nine coverage area elements, it is assumed that parameters 1 to n indicating the position and direction of the antenna exist for one movable base station 100. A parameter m, for example, consists of $\{x_m, y_m, z_m, p_m, c_m, r_m\}$. Here, $x_m$, $y_m$, and $z_m$ are the x-, y-, and z-coordinates of the center position of the antenna, respectively, and $p_m$, $c_m$, and $r_m$ are the pan, tilt, and roll angles of the antenna, respectively.

The communication quality calculation unit 310 calculates the propagation loss L from the movable base station 100 to each coverage area element for each parameter, and stores, for example, the following information in the storage unit 350.

"Parameter 1: Propagation Loss to Coverage Area Element 1, Propagation Loss to Coverage Area Element 2, . . . , Propagation Loss to Coverage Area Element 9," "Parameter 2: Propagation Loss to Coverage Area Element 1, Propagation Loss to Coverage Area Element 2, . . . , Propagation Loss to Coverage Area Element 9," . . . , "Parameter n: Propagation Loss to Coverage Area Element 1, Propagation Loss to Coverage Area Element 2, . . . , Propagation Loss to Coverage Area Element 9."

The information is stored in the storage unit 350 for each of the plurality of movable base stations 100.

<S105: Estimated Received Power Calculation>

The communication quality calculation unit 310 calculates an estimated received power (RSSI, RSRP, etc.) from a transmission output P-propagation loss L for each movable base station 100, each parameter, and each coverage area element.

<S106: Communication Quality Calculation>

The communication quality calculation unit 310 converts the estimated received power calculated in S105 into an estimated throughput (or estimated MCS) for each parameter and each coverage area element on the basis of the correspondence relationship between the radio wave intensity (reception power) and the communication quality acquired in S101.

The "parameter" is a parameter combining the parameters of the plurality of movable base stations. For example, it is assumed that there are the movable base stations 100-1 and 100-2, and at the stage of S105, the estimated received power for each coverage area element is obtained for each of parameters 1-1 to 1-$n$ of the movable base station 100-1, and the estimated received power for each coverage area element is obtained for each of parameters 2-1 to 2-$n$ of the movable base station 100-2.

Each parameter in the parameters 1-1 to 1-$n$ and the parameters 2-1 to 2-$n$ represents the position and direction of the antenna, for example, as $\{x_m, y_m, z_m, p_m, c_m, r_m\}$ as described above.

For example, when the estimated received power of the coverage area element 1 for the parameter 1-1 is Pa and the estimated received power of the coverage area element 1 for the parameter 2-1 is Pb, the estimated throughput in the coverage area element 1 in the case of "parameter 1-1 and parameter 2-1" may be calculated, for example, as the sum of the estimated throughput for Pa and the estimated throughput for Pb, or may be the larger one of the estimated throughput for Pa and the estimated throughput for Pb. The same applies to the estimated MCS.

As described above, an estimated throughput (estimated MCS) for each coverage area element is calculated for each of "parameter 1-1 and parameter 2-1," "parameter 1-1 and parameter 2-2," . . . , "parameter 1-$n$ and parameter 2-$n$," which are all combinations of the parameters 1-1 to 1-$n$ and the parameters 2-1 to 2-$n$.

When there are a plurality of movable base stations, the following "parameter" is a combination of parameters of the plurality of movable base stations such as "parameter 1-1 and parameter 2-1."

<S107: Communication Quality Total Value Calculation>

In S107, the communication quality calculation unit 310 calculates a total value E0 of an estimated throughput (or estimated MCS) of all coverage area elements for each parameter, and stores the total value in the storage unit 350. Calculating the total value E0 as the index value is an example.

The communication quality calculation unit 310 may set a target value (quality target value) of throughput (or MCS) for each coverage area element in advance, and calculate, for each parameter, a total value E1 of a quality target value achievement rate (estimated throughput quality/target value or MCS/quality target value) for each coverage area element. Further, the communication quality calculation unit 310 may set a target value (quality target value) of throughput (or MCS) for each coverage area element in advance, determine whether or not the quality target value is achieved for each coverage area element, and calculate, for each parameter, a number E2 of the coverage area elements to be achieved (estimated throughput (or MCS)≥quality target value).

<S108: Parameter Selection>

The base station control unit 340 selects a parameter that maximizes E0 (or E1 or E2).

<S109: Antenna Position/Direction Control>

The base station control unit 340 transmits the parameter selected in S108 to the corresponding movable base station 100, thereby controlling the movable base station 100 so that the antenna position and direction are indicated by the parameter.

In the examples of S101 to S109 described above, the communication quality of each coverage area element is calculated and the total of all the coverage area elements is calculated, but this is an example. By acquiring the position information of each terminal 200 by the information acquisition unit 330, the communication quality of each terminal may be calculated instead of each coverage area element, and the total of all the terminals may be calculated to perform the same control as described above. In this case, the "coverage area element" may be replaced by a "terminal."

By performing the control as described above, it is possible to maximize the overall communication quality even in an environment where there are moving shields.

Hardware Configuration Example

The control device 300 in the present embodiment can be implemented by, for example, causing a computer to execute a program describing details of processing described in the present embodiment. Note that this "computer" may be a physical machine or a virtual machine on the cloud. When using a virtual machine, the "hardware" described here is virtual hardware.

The program can be stored and distributed by being recorded in a computer-readable recording medium (portable memory or the like). Furthermore, the program can also be provided through a network such as the Internet or an electronic mail.

Figure 7:
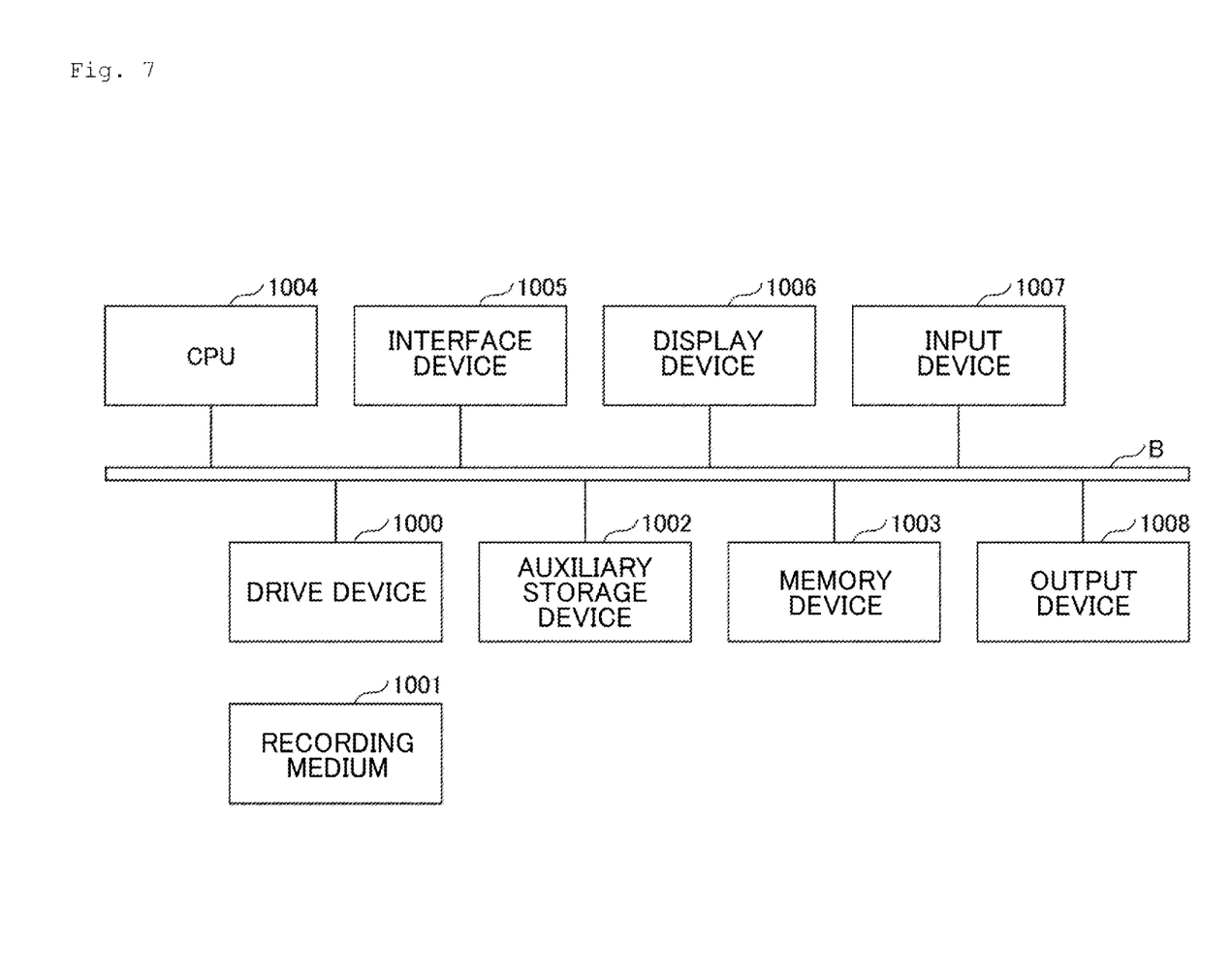
FIG. 7 is a diagram illustrating a hardware configuration example of a device.

FIG. 7 is a diagram illustrating a hardware configuration example of the computer. The computer illustrated in FIG. 7 includes a drive device 1000, an auxiliary storage device 1002, a memory device 1003, a CPU 1004, an interface device 1005, a display device 1006, an input device 1007, an output device 1008, and the like, which are connected to each other via a bus B.

The program for implementing the processing in the computer is provided by, for example, a recording medium 1001 such as a CD-ROM or a memory card. When the recording medium 1001 in which the program is stored is set in the drive device 1000, the program is installed from the recording medium 1001 to the auxiliary storage device 1002 through the drive device 1000. However, the program need not necessarily be installed from the recording medium 1001, and may be downloaded from another computer via a network. The auxiliary storage device 1002 stores the installed program and stores necessary files, data, and the like.

The memory device 1003 reads and stores the program from the auxiliary storage device 1002 when there is an instruction to start the program. The CPU 1004 implements functions related to the control device 300 according to the program stored in the memory device 1003. The interface device 1005 is used as an interface for connection to a network. The display device 1006 displays a graphical user interface (GUI) or the like according to a program. The input device 1007 includes a keyboard and mouse, buttons, a touch panel, or the like, and is used to input various operation instructions. The output device 1008 outputs a calculation result.

Effects of Embodiment

With the technique according to the present embodiment, since the communication quality maximization control is performed by using not the estimated value of the received power but the quality estimated value (estimated MCS or estimated throughput) converted (estimated) therefrom, it is possible to increase the possibility of maximizing the communication quality of the entire area. The effect of each index is as follows.

(Index 1) A total value E0 of an estimated throughput (code rate or MCS index corresponding to estimated MCS) of all coverage area elements (or terminals) is calculated and stored, and a movable base station is controlled by using a parameter that maximizes E0. Thus, the communication quality of the entire area can be controlled to a value close to the maximum with simple calculations.

(Index 2) A target value (quality target value) of throughput (or MCS) is set for each coverage area element (or terminal) in advance, a total value E1 of a quality target value achievement rate (estimated throughput (code rate or MCS index corresponding to estimated MCS)/ quality target value) for each coverage area element (or terminal) is calculated and stored, and control for maximizing E1 is performed. Thus, the communication quality of the entire area can be controlled to a value closer to the maximum while satisfying desired communication quality.

(Index 3) A target value (quality target value) of throughput (or MCS) is set for each coverage area element (or terminal) in advance, whether or not the quality target value is achieved is determined for each coverage area element (terminal), a number E2 of the coverage area elements (or terminals) to be achieved is calculated and stored, and control for maximizing E2 is performed. Thus, the area of an area satisfying desired communication quality can be controlled to a value close to the maximum.

Summary of Embodiment

This specification discloses at least a control device (a control apparatus), a communication system, a control method, and a program according to the following items.

(Item 1)

A control apparatus in a wireless communication system including the control apparatus and a movable base station, the control apparatus including:
  an information acquisition unit that acquires shield sensing information;
  a shield map generation unit that generates a shield map on the basis of the shield sensing information;
  a communication quality calculation unit that calculates an estimated received power in each coverage area element or each terminal for each position and direction of an antenna of the movable base station on the basis of the shield map, calculates an estimated communication quality in each coverage area element or each terminal on the basis of the estimated received power, and calculates an index value for controlling the movable base station on the basis of the estimated communication quality; and
  a base station control unit that controls the position and direction of the antenna of the movable base station so that the index value is maximized.

(Item 2)

The control apparatus according to Item 1, wherein the communication quality calculation unit calculates, as the index value, a total value of the estimated communication quality over all coverage area elements or all terminals.

(Item 3)

The control apparatus according to Item 1, wherein the communication quality calculation unit sets a target value of communication quality for each coverage area element or each terminal in advance, calculates a target value achievement rate in each coverage area element or each terminal from the estimated communication quality and the target value, and calculates, as the index value, a total value of the target value achievement rates over all the coverage area elements or all the terminals.

(Item 4)

The control apparatus according to Item 1, wherein the communication quality calculation unit sets a target value of communication quality for each coverage area element or each terminal in advance, determines whether or not the target value is achieved in each coverage area element or each terminal from the estimated communication quality and the target value, and calculates, as the index value, the number of coverage area elements or the number of terminals that have achieved the target value.

(Item 5)

A communication system including:
  the control apparatus according to any one of Items 1 to 4; and
  the movable base station.

(Item 6)

A control method performed by a control apparatus in a wireless communication system including the control apparatus and a movable base station, the control method including:
  an information acquisition step of acquiring shield sensing information;
  a shield map generation step of generating a shield map on the basis of the shield sensing information;
  a communication quality calculation step of calculating an estimated received power in each coverage area element or each terminal for each position and direction of an antenna of the movable base station on the basis of the shield map, calculating an estimated communication quality in each coverage area element or each terminal on the basis of the estimated received power, and calculating an index value for controlling the movable base station on the basis of the estimated communication quality; and
  a base station control step of controlling the position and direction of the antenna of the movable base station so that the index value is maximized.

(Item 7)

A program for causing a computer to function as each unit in the control apparatus according to any one of Items 1 to 4.

Although the present embodiment has been described above, the present invention is not limited to such a specific embodiment, and various modifications and changes can be made within the scope of the gist of the present invention described in the claims.

REFERENCE SIGNS LIST

10 Shield sensor
20 Shield
100 Movable base station
105 Movable unit
110 Operation mechanism unit
120 Wireless transmission/reception unit
130 Signal demodulation unit
200 Terminal
210 Wireless transmission/reception unit
220 Position information acquisition unit
230 Shield sensing
300 Control device
310 Communication quality calculation unit
320 Shield map generation unit
330 Information acquisition unit
340 Base station control unit
350 Storage unit
400 Shield sensing unit
1000 Drive device
1001 Recording medium
1002 Auxiliary storage device
1003 Memory device
1004 CPU
1005 Interface device
1006 Display device
1007 Input device
1008 Output device

The invention claimed is:

1. A control apparatus in a wireless communication system including the control apparatus and a movable base station, the control apparatus comprising:
  a processor; and
  a memory that includes instructions, which when executed, cause the processor to execute:

acquiring shield sensing information;
generating a shield map on the basis of the shield sensing information;
calculating an estimated received power in each coverage area element or each terminal for each position and direction of an antenna of the movable base station on the basis of the shield map, calculating an estimated communication quality in each coverage area element or each terminal on the basis of the estimated received power, and calculating an index value for controlling the movable base station on the basis of the estimated communication quality; and
controlling the position and direction of the antenna of the movable base station so that the index value is maximized.

2. The control apparatus according to claim 1, wherein the calculating includes calculating, as the index value, a total value of the estimated communication quality over all the coverage area elements or all the terminals.

3. The control apparatus according to claim 1, wherein the calculating includes setting a target value of communication quality for each coverage area element or each terminal in advance, calculating a target value achievement rate in each coverage area element or each terminal from the estimated communication quality and the target value, and calculating, as the index value, a total value of the target value achievement rates over all the coverage area elements or all the terminals.

4. The control apparatus according to claim 1, wherein the calculating includes setting a target value of communication quality for each coverage area element or each terminal in advance, determining whether or not the target value is achieved in each coverage area element or each terminal from the estimated communication quality and the target value, and calculating, as the index value, a number of coverage area elements or a number of terminals that have achieved the target value.

5. A communication system comprising:
the control apparatus according to claim 1; and
the movable base station.

6. A non-transitory computer-readable recording medium having computer-readable instructions stored thereon, which when executed, cause a computer including a memory and a processor to execute the acquiring, the generating, the calculating, and the controlling of the control apparatus according to claim 1.

7. A control method performed by a computer in a control apparatus in a wireless communication system including the control apparatus and a movable base station, the control method comprising:
acquiring shield sensing information;
generating a shield map on the basis of the shield sensing information;
calculating an estimated received power in each coverage area element or each terminal for each position and direction of an antenna of the movable base station on the basis of the shield map, calculating an estimated communication quality in each coverage area element or each terminal on the basis of the estimated received power, and calculating an index value for controlling the movable base station on the basis of the estimated communication quality; and
controlling the position and direction of the antenna of the movable base station so that the index value is maximized.

* * * * *